US011644885B2

(12) United States Patent
Correia Xavier (10) Patent No.: US 11,644,885 B2
(45) Date of Patent: May 9, 2023

(54) POWER MANAGEMENT ARRANGEMENT AND METHOD OF OPERATION (71) Applicant: Nanopower AS, Skien (NO)

(72) Inventor: William Correia Xavier, Vagos (PT)

(73) Assignee: Nonopower AS, Skien (NO)

(*) Notice: Subject to any disclaimer, the term of this patent is extended or adjusted under 35 U.S.C. 154(b) by 0 days.

(21) Appl. No.: 17/051,010

(22) PCT Filed: Sep. 27, 2019

(86) PCT No.: PCT/EP2019/076209
§ 371 (c)(1),
(2) Date: Oct. 27, 2020

(87) PCT Pub. No.: WO2020/065022
PCT Pub. Date: Apr. 2, 2020

(65) Prior Publication Data
US 2021/0303052 A1 Sep. 30, 2021

(30) Foreign Application Priority Data

Sep. 27, 2018 (LU) .......................... 100947

(51) Int. Cl.
G06F 1/00 (2006.01)
G06F 1/3234 (2019.01)
G06F 1/26 (2006.01)
G06F 13/24 (2006.01)
G16Y 10/75 (2020.01)
G06F 1/3203 (2019.01)

(52) U.S. Cl.
CPC .............. G06F 1/325 (2013.01); G06F 1/266 (2013.01); G06F 13/24 (2013.01); G06F 1/3203 (2013.01); G16Y 10/75 (2020.01)

(58) Field of Classification Search
CPC .......... G06F 1/325; G06F 13/24; G06F 1/266; G16Y 10/75
USPC ....................................................... 713/300
See application file for complete search history.

(56) References Cited

U.S. PATENT DOCUMENTS

| 9,497,572 | B2* | 11/2016 | Britt ........................ H04W 4/80 |
| 9,503,969 | B1* | 11/2016 | Zakaria ............. H04W 52/0229 |
| 2005/0138441 | A1* | 6/2005 | Huffman ............... G06F 1/3268 713/300 |
| 2005/0268118 | A1* | 12/2005 | Zebelloni ................. H04Q 9/04 713/300 |

(Continued)

FOREIGN PATENT DOCUMENTS

EP 2999276 A1 7/2014
WO 2017/165906 A1 10/2017

Primary Examiner — Volvck Derose
(74) Attorney, Agent, or Firm — 24IP Law Group USA, PLLC; Timothy R DeWitt (57) ABSTRACT A power management arrangement (10) for a device connection system 5 is described. The power management arrangement comprises a processing module (30) connected to data communication lines (35) for exchanging data with one or more peripherals (100), an interrupt interface (20) connected to interrupt channels (25) for sending an interrupt to and from one or more of the peripherals (100), and a local storage (50) connected to the processing module (30) for storing of logic operations relating to communication with and operation of the plurality of peripherals (100).

18 Claims, 6 Drawing Sheets (56) References Cited

U.S. PATENT DOCUMENTS

| | | | | |
|---|---|---|---|---|
| 2011/0145459 A1* | 6/2011 | Conti | ...................... | G06F 13/24 |
| | | | | 710/261 |
| 2012/0173782 A1* | 7/2012 | Frantz | ................... | G06F 9/4418 |
| | | | | 710/267 |
| 2013/0330074 A1* | 12/2013 | Kikuzawa | ............ | H04B 10/272 |
| | | | | 398/38 |
| 2014/0229644 A1* | 8/2014 | Thanigasalam | ..... | G06F 13/4282 |
| | | | | 710/262 |
| 2014/0281605 A1* | 9/2014 | Bose | ..................... | G06F 1/3243 |
| | | | | 713/320 |
| 2014/0306657 A1* | 10/2014 | Lundgren | ............... | H02J 50/12 |
| | | | | 320/108 |
| 2015/0138593 A1* | 5/2015 | Iizuka | ................. | G06K 15/406 |
| | | | | 358/1.15 |
| 2016/0077575 A1* | 3/2016 | Paul | ..................... | G06F 1/3228 |
| | | | | 713/323 |
| 2016/0124495 A1* | 5/2016 | Kim | ..................... | G06F 1/3228 |
| | | | | 713/323 |
| 2016/0278014 A1* | 9/2016 | Chen | ................. | H04W 52/0235 |
| 2017/0364137 A1* | 12/2017 | Gendler | ................. | G06F 13/24 |
| 2017/0371577 A1* | 12/2017 | Liu | .......................... | G06F 1/28 |
| 2018/0328999 A1* | 11/2018 | Tashima | ................ | G01R 31/42 |

\* cited by examiner

POWER MANAGEMENT ARRANGEMENT AND METHOD OF OPERATION

CROSS-REFERENCE TO RELATED APPLICATIONS

This application is a U.S. national stage of PCT Application No. PCT/EP2019/076209, which claims the priority of and benefit to Luxembourg Patent Application No. LU 100947 filed on 27 Sep. 2018. The foregoing applications are hereby incorporated by reference in their entirety.

BACKGROUND OF THE INVENTION

Field of the Invention

The invention relates to a power management arrangement as well as a method of operation of the power management arrangement in a system.

Brief Description of the Related Art

Systems are known which comprise a plurality of peripherals and a power supply, such as a battery or energy harvesting.

One example of a system is a battery powered wireless system for temperature monitoring. Similarly, the system could also be a cellular phone with many different peripheral components which need to be managed.

The term "Internet of Things" (abbreviated to IoT) has been developed to describe interconnected devices and refers to interconnection of uniquely identifiable external devices within an Internet infrastructure. Each one of the interconnected devices is allocated a unique IP address to enable the devices to be identified in the IoT network. Take-up of the IoT networks has been increasing and ultimately, IoT technology is expected to result in new, wide-ranging types of applications in which virtually any type of physical thing may be monitored and provide information about itself or its surroundings and/or may be remotely accessed over a network, such as a local network, an intranet, or the Internet.

Such IoT networks are known, for example, from U.S. Pat. No. 9,497,572 (Britt et al, assigned to Afero, Inc.) which teaches an IoT network and a method with a so-called IoT hub connected via a wireless system to an IoT device and a local communication interface to communicatively couple the IoT hub with a plurality of different types of IoT devices. The IoT device has a memory for storing program code and a microprocessor for executing the program code. The program code in this patent is described as including basic building blocks to enable a developer to implement any type of IoT device.

Similarly, U.S. Pat. No. 9,503,969 B1 (Zakaria, assigned to Afero, Inc), describes an IoT network with the connectivity between a plurality of IoT devices and an IoT hub. The patent discloses an apparatus and method for adjusting a scan interval or scan width of BLE devices, which are located in the IoT devices. The IoT devices have one or more peripherals, such as sensors, which are located within the IoT devices. The focus of this patent is linked to low power sleep states of the BLE modules in the IoT devices but addresses how the wireless connection can be reinstated between the IoT device and the IoT hub following wake up of the BLE module. The patent does not address how a low power state can be enabled or managed within the IoT device.

The development and adoption of IoT solutions have been comparatively slow due to issues related to connectivity, a lack of standardization, and power consumption.

Connectivity for IoT solutions is currently commonly solved using the Bluetooth protocol. Other protocols are used, such as IEEE 802.11, DECT, Zigbee, and proprietary protocols. The Bluetooth protocol for wireless communication is an open specification that facilitate low-power, short-range, and low-cost connections between the IoT devices and an IoT hub. There are several Bluetooth devices, such as but not limited to, smartphones, connected cars, electronic cameras, toys, health monitoring systems, etc. that are commercially available. However, the devices implementing the Bluetooth protocol, especially the standalone ones, also have limited energy resources for keeping a Bluetooth transceiver running the Bluetooth protocol for longer periods of time.

The Bluetooth 4.0 protocol was released in June 2011 to address power consumption issues and has led to very low energy consumption. The Bluetooth 4.0 protocol includes a Bluetooth Low Energy feature (BLE) which enables Bluetooth devices to transmit very small packets of data at a time, while consuming significantly less power compared to those devices implementing previous Bluetooth protocols. Thus, using this small data packets, broadcasting feature, Bluetooth devices can function for months or even years on small-sized batteries.

The same principle is applicable to other communication technologies, like Wi-Fi, Zig Bee, GSM/Cellular, however their requirements in terms of power are typically significantly larger than BLE.

Connecting IoT devices such as door locks, environmental sensors, home security sensors, beacons, or asset trackers, for example, requires an electrical source or power storage such as a battery to power each of the connected IoT devices. External electrical sources are often not conveniently located or available, while batteries have a finite lifetime depending on their size and the power consumption of the IoT device in different modes of operation.

The continuous reduction of the size of electronic devices has led to the development of new power management arrangements in order to keep battery sizes small and battery longevity acceptable. A more recent trend in microcontroller systems is the low power consumption while maintaining communication features. It is now common with small systems including protocols such as BLE, GPS, Wi-Fi or Zig Bee that are powered by a simple CR2450 battery. Additional techniques to reduce power consumption involve keeping microcontrollers and other components in some form of idle mode for as long as possible to save power and thereby to increase the battery lifetime.

Despite these improvements in power consumption, there are still power consumption issues to be resolved for the battery powered devices. Firstly, microcontrollers do not perform power management. Secondly, microcontroller-based systems will always experience a continuous power consumption due to the continuous consumption of power by the microcontroller itself. Finally, the process of waking up a wireless chip from an idle mode to an active mode or wake-up takes some time (as discussed in the above-referenced U.S. Pat. No. 9,503,969) and there is an additional increase in current and thus power consumption during the wake-up period. This means that a wireless chip is seldom a good choice for systems powering on/off to save energy.

To address these problems, an improved power management arrangement has been developed.

SUMMARY OF THE INVENTION

A power management arrangement and a method for managing power in a connection system is described in this document. The device connection system comprises the power management arrangement and one or more peripherals.

A power management arrangement can be implemented as discrete components or can be entirely embedded on silicon.

The power management arrangement is located in a device, such as an IoT device, and comprises a processing module connected to one or more data communication lines which are used for exchanging data within the power management arrangement and with one or more peripherals. Interrupt channels for sending and receiving interrupts within the power management arrangement and to or from one or more of the peripherals are present in the power management arrangement. A local storage is connected to the processing module and stores logic operations relating to communication with and operation of the power management arrangement and the one or more peripherals.

The interrupts are bidirectional within the power management arrangement and to and from the peripherals. The interrupts can be sent from the processing module to one of the peripherals to initiate communication between the processing module and the peripheral. The peripheral will acknowledge the interrupt and data can be exchanged between the peripheral and the processing module. In another aspect, the peripheral will initiate the communication by sending the interrupt to the processing module. The receipt of the interrupt will trigger the processing module to wake up from an idle mode or sleep mode. The processing module will acknowledge the receipt of the interrupt and will then exchange data with the peripheral.

Interrupts can either be direct or via an interrupt interface to wake up the processing module and the peripherals.

The power management arrangement may also include a timer which can be used to generate interrupts to the processing module or peripherals over the interrupt channels at a desired interval or time and date.

The peripherals can be a multitude of different types, both with master and slave capabilities. Masters are bidirectional, i.e., can both receive and give settings or commands, e.g., a processor. Slaves must be set by the system when activated, e.g., sensors which monitor physical properties, such as but not limited to movement, temperature, air pressure, fluid flow, and tilt/angle. Non-limiting examples of the sensors include accelerometer, gyroscopes, tilt sensors, microphones, cameras/videos, and hygrometers. The peripherals typically transfer data including the values of the physical properties, interrupts, as well as a time stamp to the power management arrangement for processing, storage, and other tasks.

The power management arrangement also includes a local storage connected to the processing module which stores a plurality of logic operation rules and data related to communication and operation of the power management arrangement and the peripherals. During operation, the local storage is also available for runtime operations as well as storage of state variables for the power management arrangement and peripherals. Generally, the local storage is of a volatile type, but can be supplemented by a non-volatile storage for certain standalone or preconfigured cases that need to keep the storage without the need of power supply.

As noted above, the power management arrangement is connected to the peripherals over one or more data communication lines. These data communication lines can be idle, i.e., not carry any data and, in this idle time, the peripherals do not transmit any data to the power management arrangement. The peripherals may continue recording data and store the recorded data in local registers before passing the recorded data to the processing module and/or the host at a later point in time. The peripherals are, in other words, not continuously active transmitting data, thus lowering the power consumption.

In one aspect, the power management arrangement has a host which is also connected to the data communication lines and the interrupt channels. The host is able to exchange data directly with the peripherals through the data communication lines. The host is also able to exchange data through the processing module. The host will also be connected to the power management arrangement via bidirectional interrupt channels. The host is the master that in active mode can control and set rules for the power management arrangement and the peripherals. The host may have its own master devices directly attached to it as secondary hosts, e.g., for specific tasks. The host can in active mode be directly connected to the peripherals if required. As for the peripherals, the host will often be powered off to conserve power, handing over control to the power management arrangement when powering off or going into sleep/idle mode. One non-limiting example of the host is a wireless chip.

A plurality of power lines carry through a power multiplexer a supply voltage to the peripherals, the host, and components within the power management arrangement. The level of the supply voltage can be made adjustable through an adjustable voltage supply, such as a pulse width modulator, to supply a voltage that is just sufficient to ensure the operation of the different consumers of power. In other words, the components are not necessarily supplied with a standard 1.2, 3.5, or 5V supply voltage, but at a voltage to enable them to operate whilst consuming the minimum amount of power.

The power management arrangement may also include a connection unit, e.g., as part of the host, such as a wireless transceiver, which function is to connect the device with the power management arrangement to a controlling unit, such as an IoT hub as known from the art.

A method for managing power in a system comprising a power management arrangement and at least one peripheral is also disclosed. The method comprises initiating a connection between the peripheral and the processing module by exchanging an interrupt signal, waking up the processing module, and initiating data transfer of items of data between the at least one peripheral and the processing module. The waking up of the processing module can be initiated either on receipt of the interrupt signal from the at least one peripheral or on receipt of a wake-up signal from a timer.

In a further aspect of the invention instructions can be accessed, for example from a local storage in the power management arrangement and the accessed instructions are used by one of the peripherals or the processing module to perform a logic operation. The storage of the instructions in the local storage enables the processing module, the host and/or one or more of the peripherals to be switched off or put into idle or sleep mode and then recover its state on waking up.

DETAILED DESCRIPTION OF THE INVENTION

FIGS. 1-4 show an example of a device connection system 5 as described in this document. The device connection system 5 illustrated here is merely one example of a typical device connection system and that the invention is not limited to any particular device connection system 5.

The device connection system 5 has a power management arrangement 10 which is connected to one or more peripherals 100 by means of data communication lines 35 (FIG. 3), interrupt channels 25 (FIG. 4), and power lines 85 (FIG. 2) from a power management unit 80 to provide a supply voltage to the peripherals 100. The data communication lines 35, interrupt channels 25, and power lines 85 could be implemented as different lines at the physical level or could be implemented as a single wire connection. The power management arrangement 10 also has a processing module 30, a timer 40, and a local storage 50. The functions of these modules within the power management arrangement 10 will be explained later.

Figure 3:
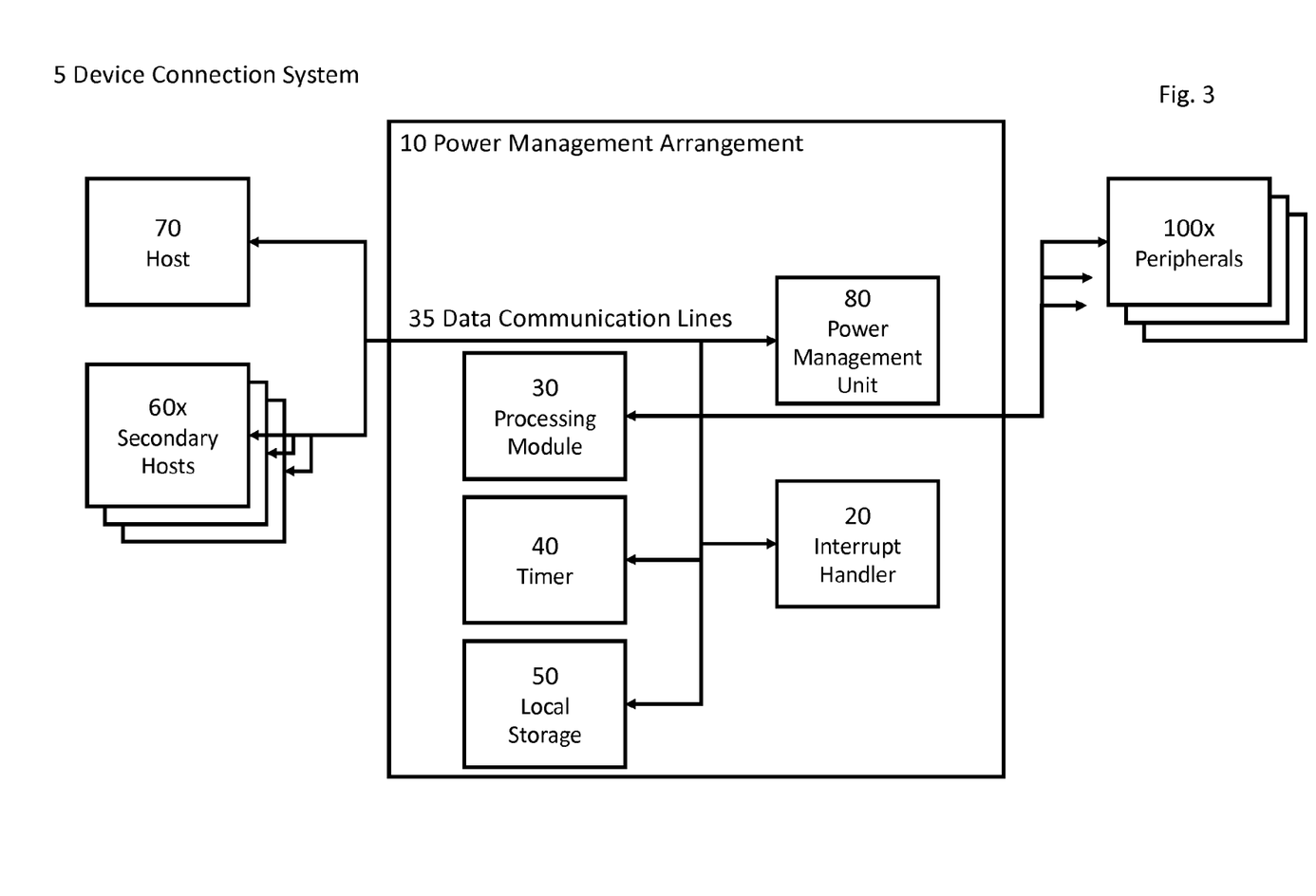

The data communication lines 35 can be, for example, tracks on a semiconductor (e.g. silicon chip) or wired connections.

A host 70 is a processing unit which is separate from the processing module 30 in the power management arrangement 10 and is connected to and able to control the power management arrangement 10 and the one or more peripherals 100. The functions of the host 70 include further processing of the data, wireless transfer of data, etc. There may also be secondary hosts 60 connected to the power management arrangement 10 and, possibly, one or more of the peripherals 100. Typically, the secondary hosts 60 are master devices utilized for special tasks or due to specific capabilities like optimized for real-time execution or low power processing. Such secondary hosts 60 are known in multi-core arrangements and offer optimized processing units for dedicated tasks to offload some of the processing power needed by the host 70. It would be possible, for example, to have one of the cores handling data transfers under the Bluetooth protocol whilst another one of the cores is handling image processing.

The peripherals 100 can have either master or slave capabilities and be either analog or digital. Examples include sensors which monitor physical properties, such as but not limited to movement, temperature, air pressure, fluid flow, and tilt/angle. Non-limiting examples of the sensors include accelerometer, gyroscopes, tilt sensors, microphones, cameras/videos, and hygrometers. The peripherals 100 may collect and transmit data. Some of the peripherals 100 will have internal registers 110 and may write a limited amount of this collected data into one or more of the internal registers 110. The peripherals 100 may or may not also perform a limited range of operations depending on the peripherals selected. The amount of power consumed by the peripherals 100 depends on their type and activity.

Figure 6:
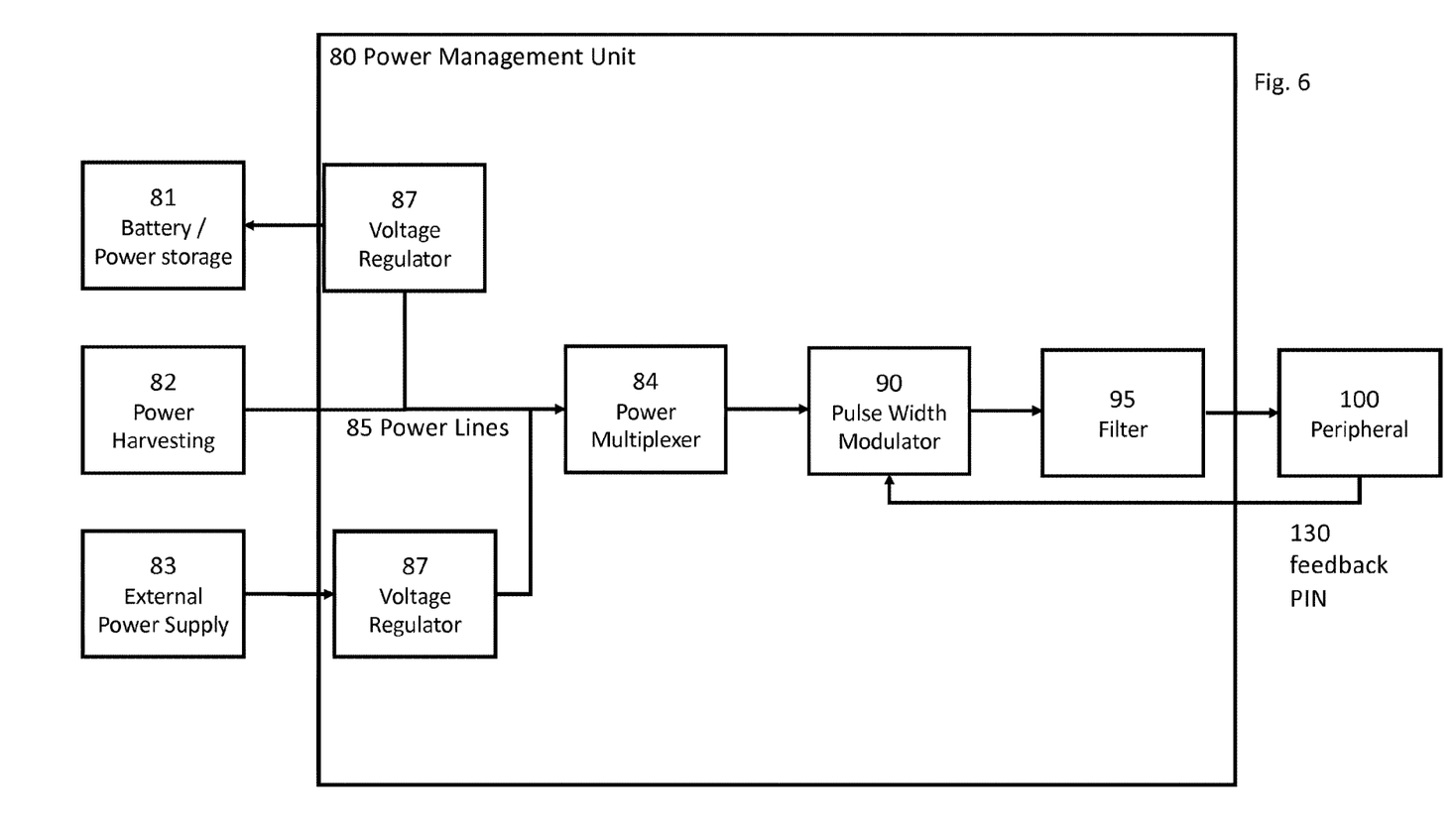
FIG. 6 shows an example of a power management unit.

An overview of the power management unit 80 is shown in FIG. 6. The power management unit 80 is, for example, a variable supply voltage device or a pulse-width modulator which can be applied to vary the output voltage and power over the power lines 85. Some peripherals 100 may have a power supply through the same physical connections as data communication lines 35.

The power management unit 80 can handle different power sources, e.g., batteries/energy storage 81, energy harvesting 82, and external power supply 83. The setup will vary the power through an all-to-all power multiplexer 84 setup, e.g., to facilitate operation based on energy harvesting 83 in different modes of operation by being able to switch between sources. As will be explained below, the small amount of power required to operate the power management arrangement means that in many cases the energy harvesting 83 may be sufficient to power at least parts of the device connection system.

The power management unit 80 is set up to supply the optimal voltage to the individual power consumer; peripherals 100, internal components of the power management arrangement 10, the host 70, the secondary hosts 60, etc. The power multiplexer 84 is used to supply one of several alternatives to achieve a solution for each use case. One exemplary use case uses a pulse width modulator 90 where the length of the duty cycle of the pulse width modulator 90 adjusts the level of the supply voltage and thus the amount of power supplied to the power consumer of the power (e.g. one or more of the peripherals 100) over the power lines 85. A filter 95 can be connected between the pulse width modulator 90 and the power consumer to smooth out the level of the supply voltage. Typical operating ranges would be 1.2-5V, but the specifications of the power consumer in question will give the operating voltage range of each individual power consumer.

The length of the duty cycle from the pulse width modulator 90 is initially set to provide the minimum operating voltage while maintaining necessary functionality to the relevant power consumer, such as one of the peripherals 100, in order to reduce the amount of power required by the power consumer. It is known that, as certain components in the power consumers age, then there may be a need to provide a higher operating voltage and more power. The peripherals 100, like for example the sensors 100a, 100b or 100c, have an output pin 130 which provides a feedback signal from the peripherals 100 to the pulse width modulator 90 to extend or shorten the duty cycle depending on the amount of power and/or the required operating voltage that is required. This would happen if, for example, the data from the peripheral 100 is no longer being produced accurately. It is also possible for one of the peripherals 100 to be in an idle or sleep state such that the peripheral is consuming only a small amount of power (in the nanoampere range, for example). On receipt of a signal from the interrupt channel 25 connected to the peripheral, the peripheral will be woken up and need to consume more power which is signaled to the attached pulse width modulator 90 to lengthen the duty cycle and supply more power.

Each pair of pulse width modulators 90 and filters 95 will be connected to different power lines 85 (shown in FIG. 6) as the operating voltages of the power consumers, e.g. the peripherals, will be different.

The power management arrangement 10 will be connected to a host 70 or one or more secondary hosts 60 through the data connection lines 35 and interrupt channels 25. The peripherals 100 may be controlled directly by the host 70 or the one or more secondary hosts 60 whilst the host 70 or the secondary hosts 60 are in operation. When the host 70 or the secondary host 60 are shut down to save energy any operations will be taken over by the power management arrangement 10.

The power management arrangement 10 as shown in FIG. 3 provides data communication lines 35 to the peripherals 100 for bidirectional communication, i.e. control and exchange of data between all components connected to the device connection system, e.g., peripherals 100, host 70, secondary hosts 60, and internal components of the power management arrangement 10 like the processing module 30, the internal storage 50, and the timer 40.

Figure 1:
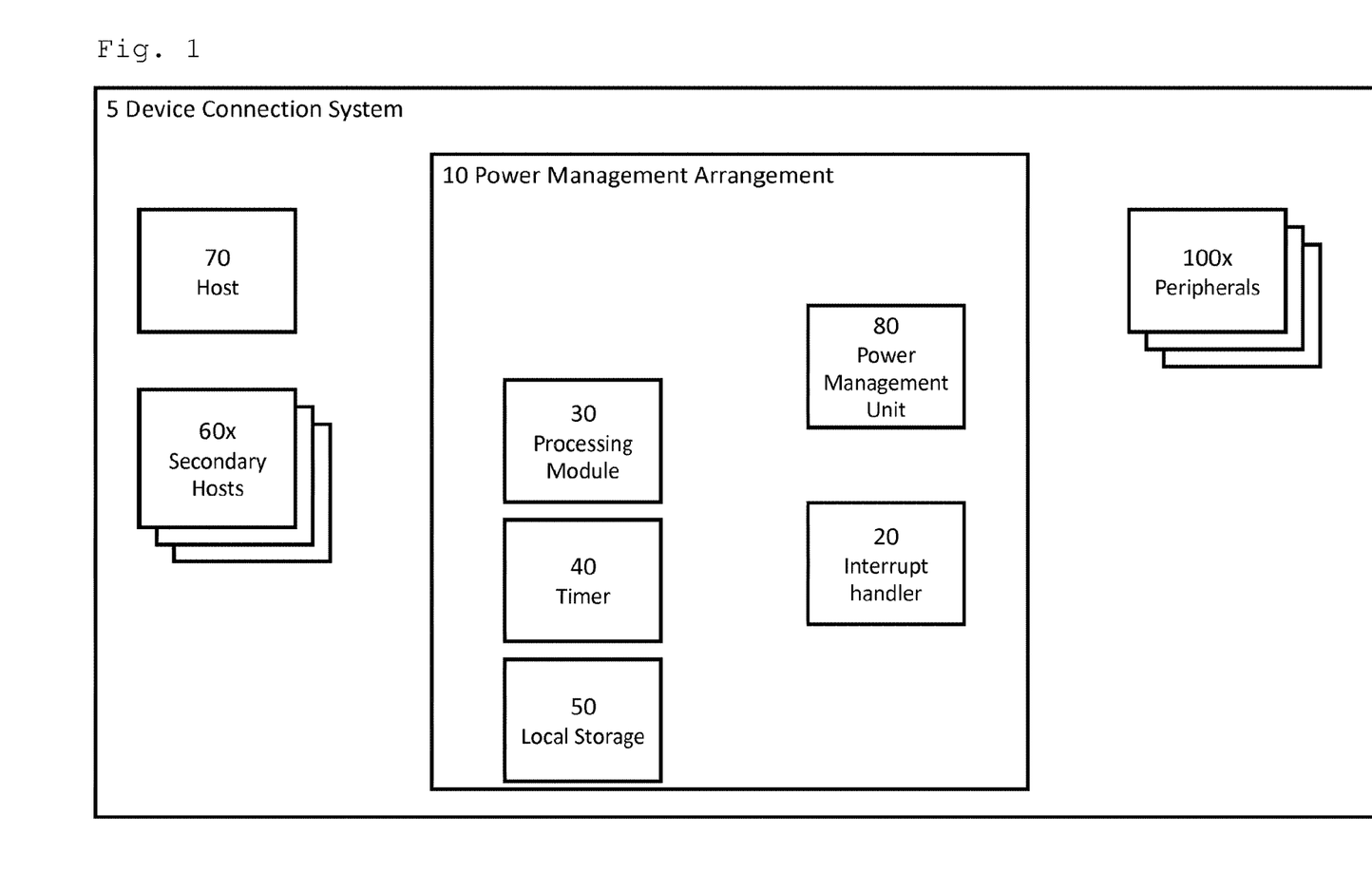
FIGS. 1-4 shows an illustrative embodiment of the power management arrangement as employed in a device.
Figure 2:
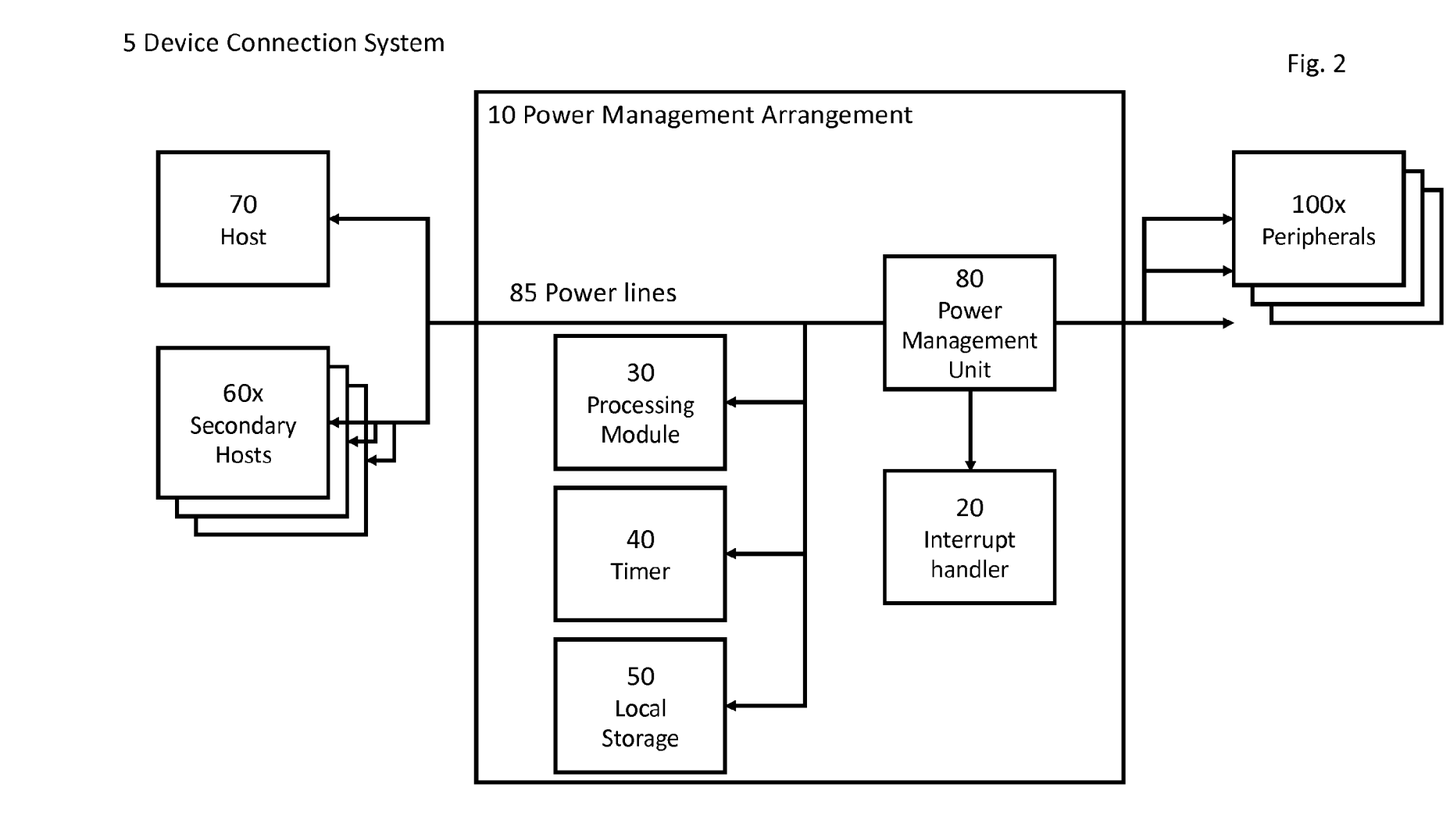

The power management arrangement 10, as can be seen in FIG. 2, is also provided with the interrupt interface 20 which connects the processing module 30, host 70, secondary hosts 60, peripherals 100, and other components of the power management arrangement 10 through interrupt channels 25. The interrupt interface 20 can route bidirectional interrupts to one or more of the connected components. For example, the peripherals 100 may be instructed to transfer any data which may be stored in the respective internal registers 110 of the peripherals 100 and pass the collected data through the data communication lines 35 to, e.g., the processing module 30, the host 70, or the secondary hosts 60. Similarly, the processing module 30 can be asked to wake-up from a low power state to an active mode for receiving data from the peripherals 100.

A local storage 50 is present on the power management arrangement 10. The local storage 50 stores rules, tasks, data and state variables for the processing module 30, host 70, secondary hosts 60, and the individual peripherals 100. The rules and tasks are generated by the host 70 or predefined and written to the local storage 50 from the processing module 30. The combination of the processing module 30 and the local storage 50 is to provide a type of "mirror" for the host 70 to control the peripherals 100. The local storage 50 stores, in one aspect of the invention, only those operations that are necessary to wake up the peripherals 100 to obtain data from the peripherals 100 along the data communication lines 35. In one further aspect, there is no host 70 present in the system and the power management arrangement 10 is pre-programmed in production or an external memory added to or connected to the power management arrangement 10 to provide the rules and tasks. The local storage will consist of a volatile storage which can be upheld with power. It may store rules from the host 70 before host 70 sleep mode is engaged and/or state variables form any component of the system for faster wake up, as well as provide necessary storage for runtime operations. An optional non-volatile storage is necessary for all standalone applications or where predefined settings must be upheld also without power supply.

The processing module 30 can wake up the host 70 by sending an interrupt to the host 70, directly or via the aforementioned interrupt interface 20.

The deep sleep mode of the device connection system 5 is a mode in which the processing module 30 is unresponsive to any external signal along the communication lines 35. Still, the processing module 30 responds by waking up based on interrupts over the interrupt channels 25. The processing module 30 will require about 7 ns to wake up.

The power management arrangement 10 includes a timer 40 which is connected to the processing module 30 and also to the interrupt interface 20. The timer 40 provides an interrupt signal along the interrupt channels 25 to initiate the processing module 30 waking up and entering a processing mode.

The timer 40 is arranged as a countdown timer and is programmed to send an interrupt along the interrupt channels 25 at certain intervals to wake up the processing module 30 when the countdown time reaches zero. The initial value set in the countdown timer 40 is variable and depends on the requirements of the environment in which the device communication system 5 is used. The timer 40 is a simple device and consumes very little power. In a deep sleep mode, the device connection system 5 in total, including timer, will have a power consumption in the 10-15 nA range.

The timer 40 can also be set to count up, and combined with a calendar it is able to wake up on a set time and date, and adjust for variations between weekdays, holidays, time of day, etc. For example, should a peripheral 100 be used during the day but not at night, it would be possible to program the timer 40 to wake up the processing module 30 at different intervals depending on the time of day. At night, for example, it is likely that less data would be collected, and less data needed to be processed, as a result the timer 40 could wake up the processing module 30 at less frequent intervals. The local storage 50 stores more complicated rules and actions for waking up using the timer 40.

The processing module 30 on waking up, will send a signal via the interrupt interface 20 through the interrupt channels 25 to the peripherals 100 to inform the peripherals 100 that the processing module 30 is able to accept data. The selected peripherals 100 are powered up or already on depending on settings, and data is then transferred from the peripherals 100 over the data communication lines 35 to the processing module 30, host 70, or secondary host 60 and processed as usual.

In one version of the power management arrangement 10, it is possible to program the processing module 30 to merely collect data from selected peripherals 100 when waking up. Since the peripherals 100 consumes power, the processing module 30 will send the interrupt through the interrupt interface 20 only to those peripherals 100 from which data is required. Those peripherals 100 for which the data is not required would not receive an interrupt. So, for example, some of the peripherals 100 could be instructed to transfer the data every five minutes, while other peripherals 100 would be instructed to transfer at, for example, hourly intervals. This gives opportunities to further reduce the power consumption.

Figure 4:
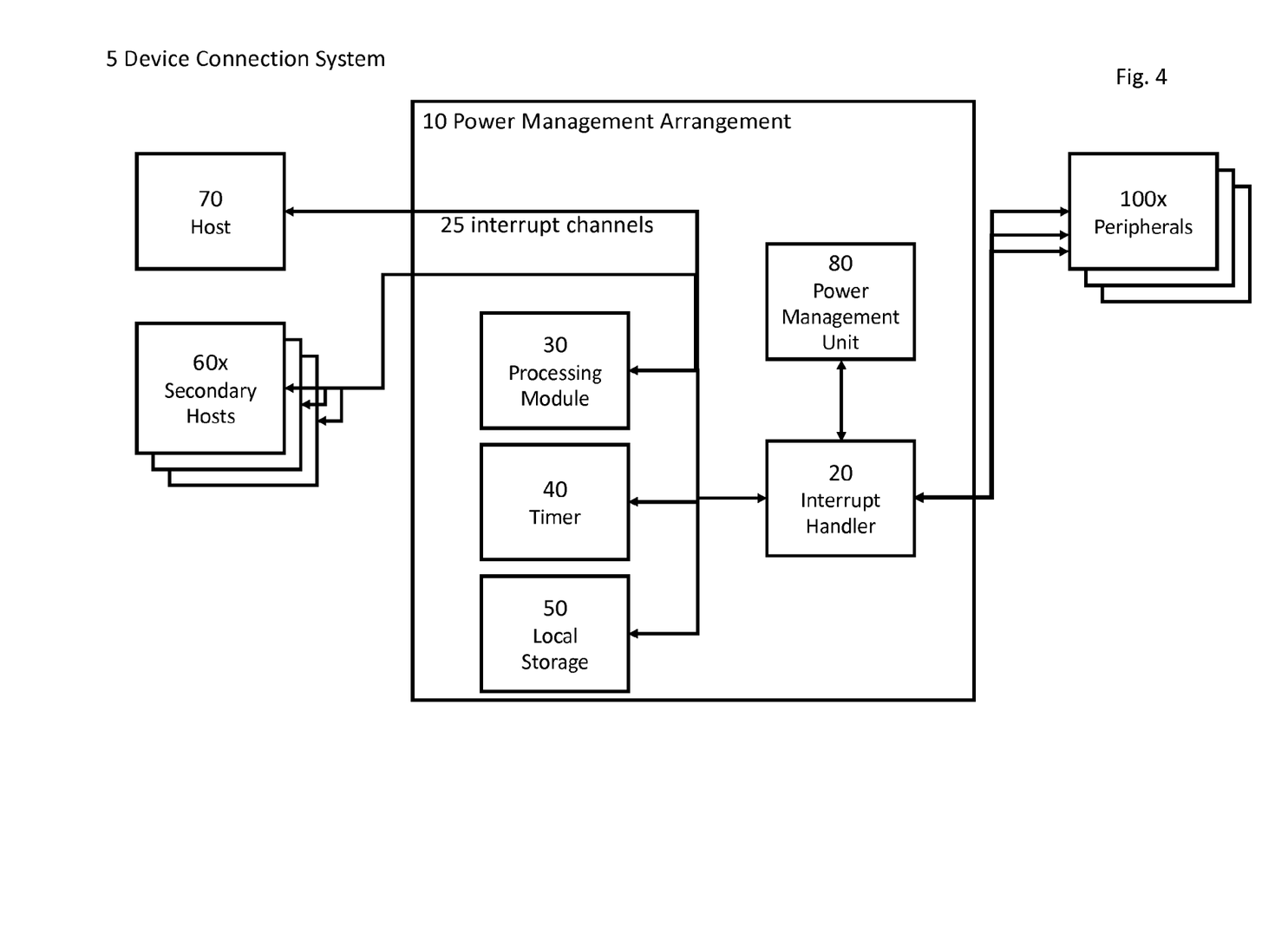
Figure 5:
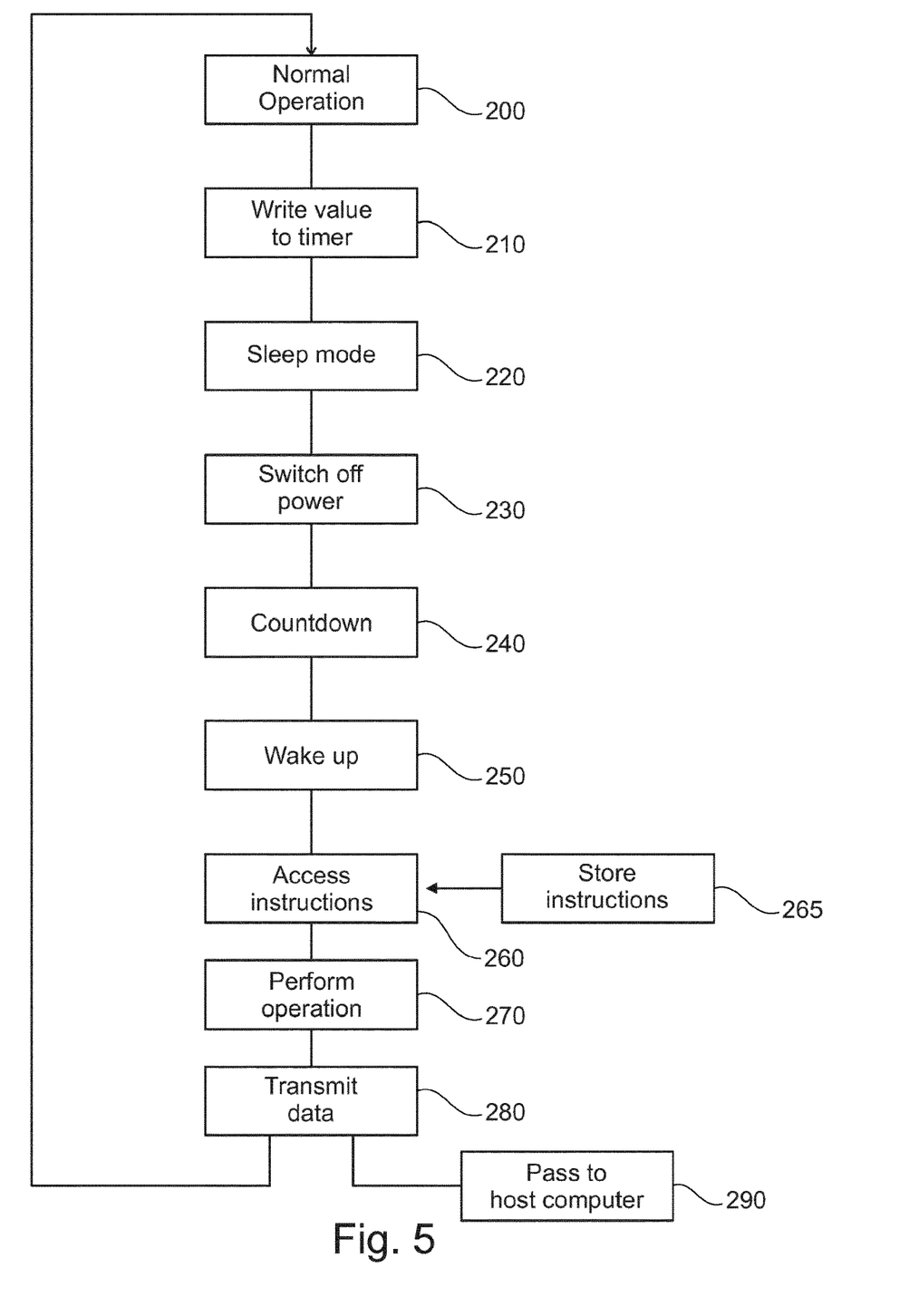
FIG. 5 shows an outline of the method for exchanging data between the power management arrangement and one or more peripheral.

FIG. 4 shows an example of the operation of the power management arrangement 10. In a first step 200 the processing module 30 is operating normally, and data is being transferred through the data communication lines 35 to and from the processing module 30. In the subsequent step 210, a countdown value for the time until when a wake-up signal shall be sent to the processing module 30 is written into an internal register of the timer 40. This countdown value could be a pre-stored default value or could depend on the time of day or other circumstances, as explained in the previous text.

The processing module 30 shuts down the power to the peripherals 100 in step 220. Finally, in step 230, the processing module 30 enters the sleep mode and shuts down the data communication lines 35. The processing module 30 is now in deep sleep mode and will wake itself up in step 250 following an interrupt from the timer 40 when the timer 40 has counted down (step 240) from the value set into its internal register in step 210. The processing module 30 resumes normal operation (step 200). It is also possible for a wake-up signal to be issued from one or more of the peripherals 100 when the peripheral 100 needs to wake up the processing module 30. This could happen, for example, when a value of the data collected by the peripheral exceeded a threshold level. One example could be when the peripheral 100 is a temperature sensor. If the temperature decreases below a certain threshold value, then a heating unit might need to be switched on. Should the temperature be higher than the threshold value, then a cooling unit needs to be switched on. In both cases, the processing module 30 will need to be woken up to send the control signals to the required devices.

On waking up, the processing module 30 will in step 260 try to fetch instructions from any possible external host 70 or secondary hosts 60, and will automatically revert to instructions in the local storage 50 if no host 70 or secondary host 60 is present, awake or set to send instructions. In step 270 the processing module 30 will pass these instructions, for example, to one or more of the peripherals 100, host 70, or secondary hosts 60 where different logic operations are performed. These logic operations include transferring of data in step 280 from the peripherals 100 to/from the processing module 30, host 70, or secondary host 60. The instructions will have been previously stored in step 265 on the local storage 50 by the processing module 30, host 70, or secondary hosts 60. The processing module 30 will also access instructions concerning the amount of power to be supplied to the peripherals 100, processing module 30, host 70, and secondary hosts 60 by the power management unit 80. This is done setting the duty cycle in the pulse width modulator 90 to provide this specific operating voltage.

In order to reduce the power requirements on starting up of the peripherals 100, the peripherals are woken up with a minimum of power required to operate the peripherals 100. This minimum amount can be programmed initially, or the amount of power supplied to the peripherals 100 along the power lines 85 can be increased. The power management arrangement 10 wake up in around 7 ns but depending on type and booting it will be appreciated that it may take longer time for peripherals 100 to wake up.

Finally, and optionally, in step 290, the data can be passed from the processing module 30 to the host 70. In some cases the data might be passed directly from the peripherals 100 to the host 70 or one of the secondary hosts 60.

A library to communicate with and configure the power management arrangement is provided which enable the power management arrangement 10 including the timer 40, the processing module 30, and the interrupt interface 20 to be programmed. API documentation is also provided for the developer to be able to use the library.

The implementation of the power management arrangement 10 is provided, for example, as an IP block which can be built into a circuit on silicon. The power management arrangement 10 will be delivered in the form of a module based on discrete components or directly on silicon, including CSP or QFN package and die for COB assembly.

REFERENCE NUMERALS

5 Device connection system
10 Power management arrangement
20 Interrupt interface
25 Interrupt channels
30 Processing module
35 Data communication lines
40 Timer
45 Timer Connection
50 Local storage
60 Secondary hosts
70 Host
80 Power management unit
81 Power storage/battery
82 Power harvesting
83 External power supply
84 Power multiplexer
85 Power lines
90 Voltage regulator
95 Pulse width modulator
100 Filter
100 Peripherals
100a, 100b, 100c Sensors
110 Registers
130 Output Pin

The invention claimed is:

1. A power management arrangement for managing a power consumption of a system having one or more peripherals, the power management arrangement comprising:
   a processing module connected to data communication lines for exchanging data within the power management arrangement and with the one or more peripherals;
   interrupt channels for sending and receiving interrupts within the power management arrangement and to or from the one or more peripherals, to wake up the processing module or the peripherals;
   a timer connected to the processing module and the interrupt channels, the timer being programmed to send at intervals an interrupt along the interrupt channels to wake up the processing module;
   a power management unit connected to power lines to provide an adjustable supply voltage within the power management arrangement and to the one or more peripherals,
   a local storage connected to the processing module and for storing logic operations relating to communication with and operation of the power management arrangement and the one or more peripherals.

2. The power management arrangement according to claim 1, wherein the system further comprises at least one of a host connected to the data communication lines and the interrupt channels.

3. The power management arrangement according to claim 2, wherein the host is directly connectable to at least one of the one or more peripherals.

4. The power management arrangement of claim 3, wherein the host is adapted to communicate directly with at least one of the one or more peripherals on receipt of an instruction.

5. The power management arrangement according to claim 1, wherein the one or more peripherals comprises one or more of a master or a slave.

6. The power management arrangement according to claim 5, wherein the master or the slave is one or more of an accelerometer, a gyroscope, a tilt sensor, a temperature sensor, a fluid-level meter, flow meters, a microphone, a camera, and a hygrometer.

7. The power management arrangement according to claim 1, further comprising a timer for sending an interrupt signal to one of the a host, or one or more of secondary hosts over the interrupt channels to initiate a processing mode from a sleep or idle mode.

8. The power management arrangement according to claim 1, further comprising interruptible power lines connected to the one or more of the peripherals, the host or one or more of the secondary hosts.

9. The power management arrangement according to claim 8, further comprising at least one of a power multiplexer or a pulse width modulator for suppling the adjustable supply voltage.

10. The power management arrangement according to claim 1, further comprising a connection unit for connecting the power management arrangement with a controlling unit.

11. The power management arrangement according to claim 1, wherein the one or more peripherals have an internal register.

12. A method for managing power in a system comprising a power management arrangement and one or more peripherals, the method comprising:
- sending at intervals, by means of a timer, an interrupt signal to a processing module for waking up the processing module;
- initiating a connection between the one or more peripherals and the processing module by exchanging a response to the interrupt signal;
- initiating data transfer of items of data between the at least one or more peripherals and the processing module; and
- providing by means of a power management unit of the power management arrangement an adjustable supply voltage within the power management arrangement and to the one or more peripherals;
- accessing, at a local storage of the power management arrangement, instructions relating to communication with and operation of the power management arrangement and the one or more peripherals; and
- performing a logic operation using the accessed instructions on the one or more peripherals;
- passing the adjustable supply voltage to the one or more peripherals.

13. The method of claim 12, wherein the waking up of the processing module is initiated on receipt of the interrupt signal from the at least one peripheral or of a wake-up signal from the timer.

14. The method of claim 12, further comprising performing a logic operation to start a host for receiving data from the processing module or directly from the one or more peripherals.

15. The method of claim 12, further comprising powering up a host.

16. The method of claim 12, further comprising storage of updated instructions in the local storage.

17. The method of claim 12, further comprises transferring instructions from a host to the local storage.

18. The method of claim 12, further comprising setting the adjustable supply voltage.

* * * * *